(12) United States Patent
Niu et al.

(10) Patent No.: US 10,045,192 B2
(45) Date of Patent: Aug. 7, 2018

(54) NETWORK ASSISTED DEVICE TO DEVICE DISCOVERY

(71) Applicants: Huaning Niu, Milpitas, CA (US); Sergey Panteleev, Nizhny Novgorod (RU); Alexey Khoryaev, Nizhny Novgorod (RU); Debdeep Chatterjee, Santa Clara, CA (US); Gang Xiong, Beaverton, OR (US)

(72) Inventors: Huaning Niu, Milpitas, CA (US); Sergey Panteleev, Nizhny Novgorod (RU); Alexey Khoryaev, Nizhny Novgorod (RU); Debdeep Chatterjee, Santa Clara, CA (US); Gang Xiong, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 54 days.

(21) Appl. No.: 14/767,671

(22) PCT Filed: Dec. 20, 2013

(86) PCT No.: PCT/US2013/077129
§ 371 (c)(1),
(2) Date: Aug. 13, 2015

(87) PCT Pub. No.: WO2014/130154
PCT Pub. Date: Aug. 28, 2014

(65) Prior Publication Data
US 2016/0014589 A1    Jan. 14, 2016

Related U.S. Application Data

(60) Provisional application No. 61/768,330, filed on Feb. 22, 2013.

(51) Int. Cl.
*H04W 8/00* (2009.01)
*H04W 72/04* (2009.01)
(Continued)

(52) U.S. Cl.
CPC ......... *H04W 8/005* (2013.01); *H04L 12/4633* (2013.01); *H04L 27/2614* (2013.01);
(Continued)

(58) Field of Classification Search
CPC . H04L 12/4633; H04L 27/2614; H04L 47/11; H04L 47/12; H04L 61/2514;
(Continued)

(56) References Cited

U.S. PATENT DOCUMENTS 8,743,823 B2 * 6/2014 Richardson ........... H04W 8/005
370/330
9,467,930 B2 * 10/2016 Lim ...................... H04W 48/12
(Continued)

FOREIGN PATENT DOCUMENTS

CN          102725993 A     10/2012
WO     WO 2012/177002 A2   12/2012
(Continued)

OTHER PUBLICATIONS

3GPP TSG SA S1#7 S1-00 0091 Sofia Antipolis, Feb. 9-Feb. 11, 2000 ftp://www.3gpp.org/tsg_sa/WG1_Serv/TSGS1_07.../Docs/S1-000090.doc.*
(Continued)

*Primary Examiner* — Edan Orgad
*Assistant Examiner* — Saumit Shah
(74) *Attorney, Agent, or Firm* — Thorpe North & Western

(57) ABSTRACT

Technology for a user equipment (UE) to communicate in a device to device (D2D) network is described. A temporary identification (Temp ID) can be received from an enhanced node B (eNB). A D2D discovery resource allocation can be
(Continued)

received within a physical uplink channel from the eNB. A UE D2D discovery resource can be selected from the D2D discovery resource allocation based on the Temp ID. A D2D discovery beacon can be transmitted from the UE D2D discovery resource to enable other UEs to detect the UE.

25 Claims, 15 Drawing Sheets

(51) Int. Cl.

| | | |
|---|---|---|
| H04W 74/02 | (2009.01) | |
| H04W 72/00 | (2009.01) | |
| H04L 12/46 | (2006.01) | |
| H04L 29/12 | (2006.01) | |
| H04W 28/02 | (2009.01) | |
| H04W 40/02 | (2009.01) | |
| H04W 48/18 | (2009.01) | |
| H04W 24/06 | (2009.01) | |
| H04W 74/00 | (2009.01) | |
| H04W 74/04 | (2009.01) | |
| H04W 74/08 | (2009.01) | |
| H04W 36/00 | (2009.01) | |
| H04W 36/30 | (2009.01) | |
| H04L 27/26 | (2006.01) | |
| H04W 40/24 | (2009.01) | |
| H04W 24/02 | (2009.01) | |
| H04W 48/14 | (2009.01) | |
| H04W 52/02 | (2009.01) | |
| H04W 28/12 | (2009.01) | |
| H04L 12/801 | (2013.01) | |
| H04W 48/08 | (2009.01) | |
| H04W 48/16 | (2009.01) | |
| H04W 72/02 | (2009.01) | |
| H04W 88/06 | (2009.01) | |
| H04L 12/725 | (2013.01) | |
| H04W 28/08 | (2009.01) | |
| H04W 84/12 | (2009.01) | |

(52) U.S. Cl.
CPC .............. *H04L 47/11* (2013.01); *H04L 47/12* (2013.01); *H04L 61/2514* (2013.01); *H04L 61/2525* (2013.01); *H04L 61/2539* (2013.01); *H04L 61/2564* (2013.01); *H04L 61/2575* (2013.01); *H04L 61/2592* (2013.01); *H04L 61/6077* (2013.01); *H04W 24/02* (2013.01); *H04W 24/06* (2013.01); *H04W 28/02* (2013.01); *H04W 28/0289* (2013.01); *H04W 28/12* (2013.01); *H04W 36/0088* (2013.01); *H04W 36/30* (2013.01); *H04W 40/02* (2013.01); *H04W 40/244* (2013.01); *H04W 48/08* (2013.01); *H04W 48/14* (2013.01); *H04W 48/16* (2013.01); *H04W 48/18* (2013.01); *H04W 52/028* (2013.01); *H04W 52/0216* (2013.01); *H04W 72/005* (2013.01); *H04W 72/02* (2013.01); *H04W 72/042* (2013.01); *H04W 72/0413* (2013.01); *H04W 72/0446* (2013.01); *H04W 74/002* (2013.01); *H04W 74/02* (2013.01); *H04W 74/04* (2013.01); *H04W 74/08* (2013.01); *H04L 45/30* (2013.01); *H04W 28/08* (2013.01); *H04W 84/12* (2013.01); *H04W 88/06* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/22* (2018.01); *Y02D 70/23* (2018.01)

(58) Field of Classification Search
CPC ............. H04L 61/2525; H04L 61/2539; H04L 61/2564; H04L 61/2575; H04L 61/2592; H04L 61/6077; H04W 24/02; H04W 24/06; H04W 28/02; H04W 28/0289; H04W 28/12; H04W 36/0088; H04W 36/30
USPC ........................................................ 370/329
See application file for complete search history.

(56) References Cited

U.S. PATENT DOCUMENTS

| | | | | |
|---|---|---|---|---|
| 9,485,069 | B2* | 11/2016 | Wang | H04L 5/0053 |
| 9,516,488 | B2* | 12/2016 | Wu | H04W 8/005 |
| 9,526,001 | B2* | 12/2016 | Stojanovski | H04W 52/0251 |
| 2010/0165882 | A1 | 7/2010 | Palanki et al. | |
| 2010/0202400 | A1 | 8/2010 | Richardson et al. | |
| 2011/0076991 | A1 | 3/2011 | Mueck et al. | |
| 2011/0222475 | A1 | 9/2011 | Hole et al. | |
| 2011/0268004 | A1 | 11/2011 | Doppler et al. | |
| 2011/0268101 | A1 | 11/2011 | Wang et al. | |
| 2011/0280203 | A1* | 11/2011 | Han | H04L 1/0031 370/329 |
| 2013/0010661 | A1 | 1/2013 | Esteves et al. | |
| 2013/0059583 | A1* | 3/2013 | Van Phan | H04W 72/04 455/435.1 |
| 2013/0288668 | A1* | 10/2013 | Pragada | H04W 12/06 455/426.1 |
| 2014/0003262 | A1* | 1/2014 | He | H04W 28/08 370/252 |
| 2014/0127991 | A1* | 5/2014 | Lim | H04W 76/023 455/39 |
| 2014/0177540 | A1* | 6/2014 | Novak | H04W 72/042 370/329 |
| 2014/0204898 | A1* | 7/2014 | Yang | H04W 8/005 370/330 |
| 2015/0296443 | A1* | 10/2015 | Lim | H04W 48/12 370/312 |

FOREIGN PATENT DOCUMENTS

| | | |
|---|---|---|
| WO | WO 2013/025040 A2 | 2/2013 |
| WO | WO 2013/025057 A2 | 2/2013 |

OTHER PUBLICATIONS

3GPP TS 36.211 V10.1.0 (Mar. 2011); Evolved Universal Terrestrial Radio Access (E-UTRA); Physical Channels and Modulation (Release 10).
3GPP TS 36.212 V10.1.0 (Mar. 2011); Evolved Universal Terrestrial Radio Access (E-UTRA); Multiplexing and channel coding (Release 10).
3GPP TS 36.213 V10.0.1 (Dec. 2010); Evolved Universal Terrestrial Radio Access (E-UTRA); Physical layer procedures (Release 10).
3GPP TS 36.331 V10.1.0 (Mar. 2011); Evolved Universal Terrestrial Radio Access (E-UTRA); Radio Resource Control (RRC); Protocol specification (Release 10).
3GPP TSG-RAN1 Meeting #72, R1-120469; St. Julian's, Malta, Jan. 28-Feb. 1, 2013; LTE device to device evaluation methodology, Agenda Item 7.3.7.
Extended European search report dated Nov. 15, 2017, in EP Application No. 17196552.8, filed Dec. 20, 2013; 11 pages.

* cited by examiner

NETWORK ASSISTED DEVICE TO DEVICE DISCOVERY

RELATED APPLICATIONS

This application claims the benefit of and hereby incorporates by reference U.S. Provisional Patent Application Ser. No. 61/768,330, filed Feb. 22, 2013.

BACKGROUND

Users of wireless and mobile networking technologies are increasingly using their mobile devices to communicate as well as send and receive data. With increased data communications on wireless networks the strain on the limited resources for telecommunications is also increasing.

To handle the increasing amount of wireless services to an increasing numbers of users, efficient use of the available radio network resources has become important. Device to Device (D2D) communications allows mobile users to directly communicate with each other with little or no burden on a wireless network. The D2D communication can occur when closely located devices are enabled to communicate with each other directly instead of using a conventional communications links such as a Wi-Fi or cellular communications system. Accordingly, device to device (D2D) services allows for communication between devices within range of an access point such as an enhanced node B (eNB) of a network and allows meeting increased demand on telecommunications systems. One of the first steps to enable D2D communication involves discovery of devices capable of D2D communication.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
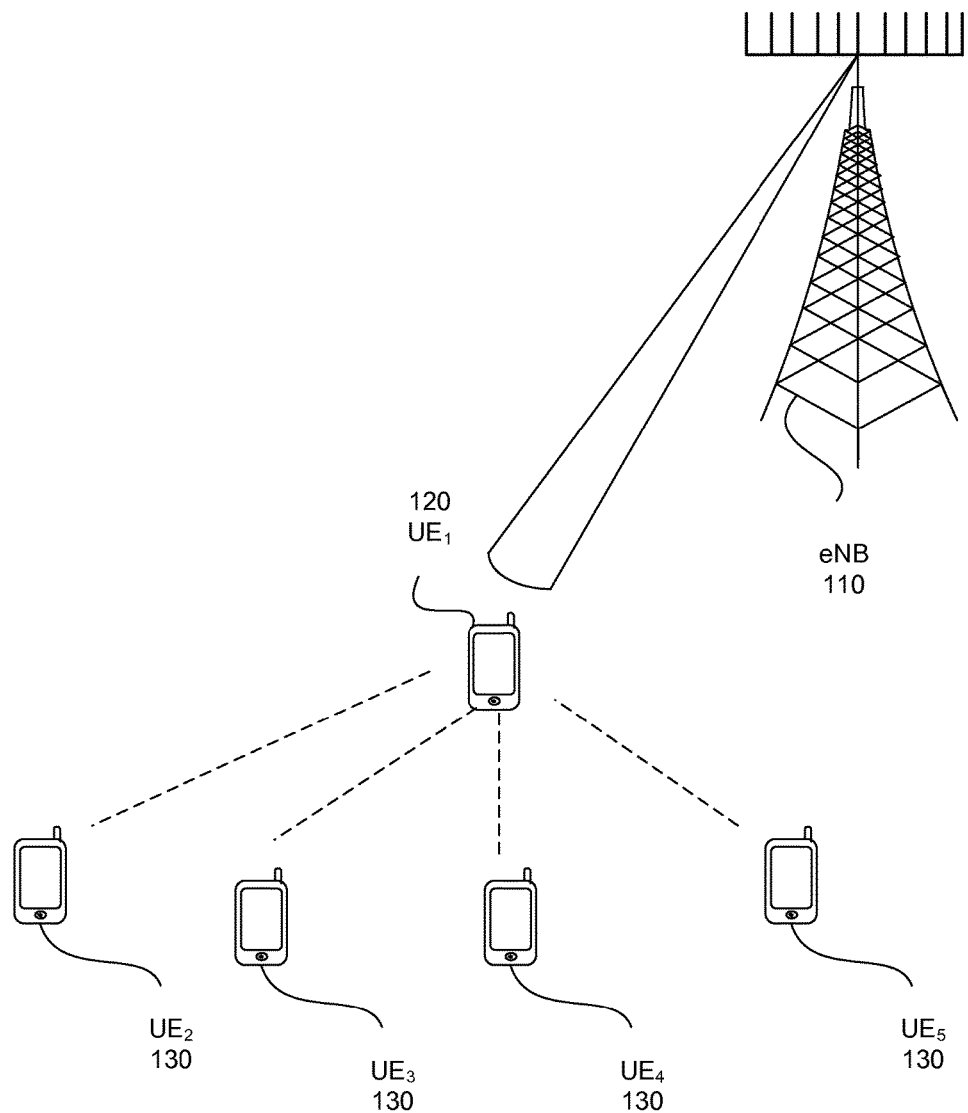
FIG. 1 depicts a UE in communication with an eNB and other UEs in a D2D network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

In Device to Device (D2D) communications, multiple mobile wireless devices, such as user equipment (UE), can be configured to directly communicate with each other. In one embodiment, a wireless network, such as a cellular third generation partnership project (3GPP) network that includes an eNB, can assist UEs in discovering other adjacent UEs configured for D2D communications.

Figure 2:
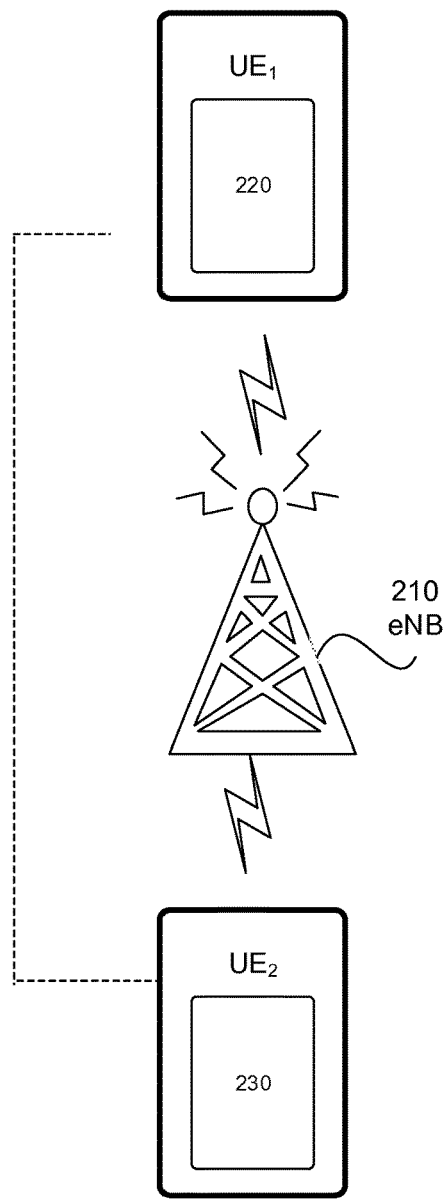
FIG. 2 depicts multiple UEs each in communication with an eNB and in direct communication with each other in accordance with an example.
Figure 3:
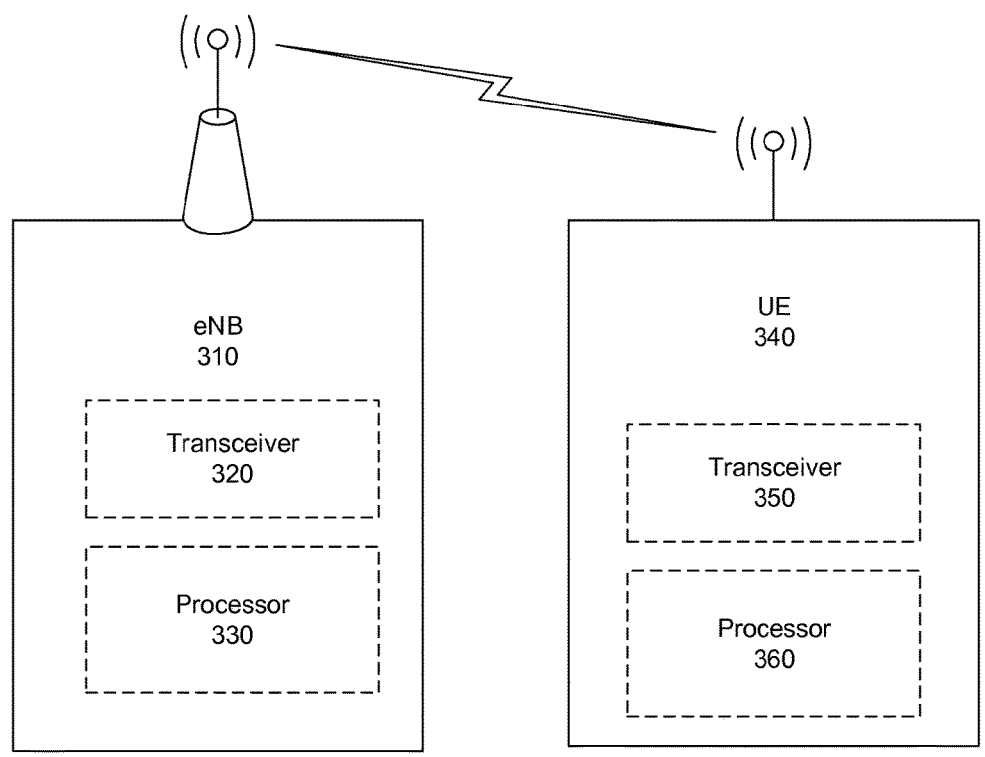
FIG. 3 illustrates an eNB and a UE each comprising a transceiver and a computer processor in accordance with an example.

FIG. 1 depicts an eNB 110 in communication with a $UE_1$ (120). The $UE_1$ (120) is in direct communication with other $UE_2$-$UE_5$ (130) in a D2D network. FIG. 2 illustrates $UE_1$ (220) and $UE_2$ (230) each in communication with the eNB 210 and $UE_1$ (220) and $UE_2$ (230) are also in direct communication with each other. The UEs in the D2D communication system may share resources of a mobile communication network, where the UEs are configured to share resources with devices that are communicating with the eNB in the cellular network. In one embodiment, the one or more cellular networks may be third generation partnership project (3GPP) long term evolution (LTE) Rel. 8, 9, 10, or 11 networks and/or Institute of Electrical and Electronics Engineers (IEEE) 802.16p, 802.16n, 802.16m-2011, 802.16h-2010, 802.16j-2009, 802.16-2009. FIG. 3 illustrates that in one embodiment of a network assisted D2D communications system, an eNB 310 comprises a transceiver 320 and a computer processor 330. FIG. 3 also illustrates that the UE 340 comprises a transceiver 350 and a computer processor 360. D2D communication systems may provide mobile device users with better quality of service (QoS), new applications, and increased mobility support. To establish D2D communications, the UEs within the D2D system can be configured to discover the D2D enabled UEs that are participating in the D2D system.

One method or system for discovering D2D enabled UEs within a wireless network configured for D2D communications that involves UEs that are able to broadcast a discovery beacon to the other adjacent UEs. The D2D discovery procedure and D2D discovery resource allocation for a discovery beacon can begin after the initial access to the network by a UE. Each UE can be assigned a temporary identification (Temp ID) for D2D discovery. In one embodiment, the network can assist in the D2D discovery procedure and D2D discovery resource allocation for a discovery beacon. Network assistance can reduce the complexity of the UEs and allow the network to work with the UEs to reduce interference between wireless network communication and D2D communication.

In one embodiment, an eNB can assign a temporary identification (Temp ID) to a UE via high layer signaling. In one embodiment, the UEs within the D2D system can be discovered using a network assisted D2D discovery procedure. In one embodiment, the D2D Temp ID can be configured to be unique over several adjacent cells to avoid ambiguity of a discovered UE definition. In one embodiment, the UEs can be synchronized within the network using an uplink (UL) synchronization channel. After assigning the Temp ID to the UE, the eNB may then allocate D2D discovery resources within a physical uplink channel, such as a physical uplink control channel (PUCCH) or a physical uplink shared channel (PUSCH). In one embodiment, the allocated resources can slowly change with the number of UEs within the cell. A UE can select one of the D2D discovery resources and a certain discovery sequence based on its Temp ID. The UE can transmit the selected discovery sequence on a resource block (RB) of a UL signal as a discovery beacon. In one embodiment, other UEs that are not transmitting a discovery beacon can listen for the D2D discovery resource and attempt to decode Temp IDs. In one embodiment, the UE can communicate with the eNB, using a physical uplink shared channel (PUSCH), a list of Temp IDs that the UE has discovered. The eNB can then identify the UEs based on the assigned Temp IDs and feedback to the UE, using a PDSCH, the identification of the discovered UEs. The UE can then use the identification information to request D2D communication with the discovered UEs.

Figure 4:
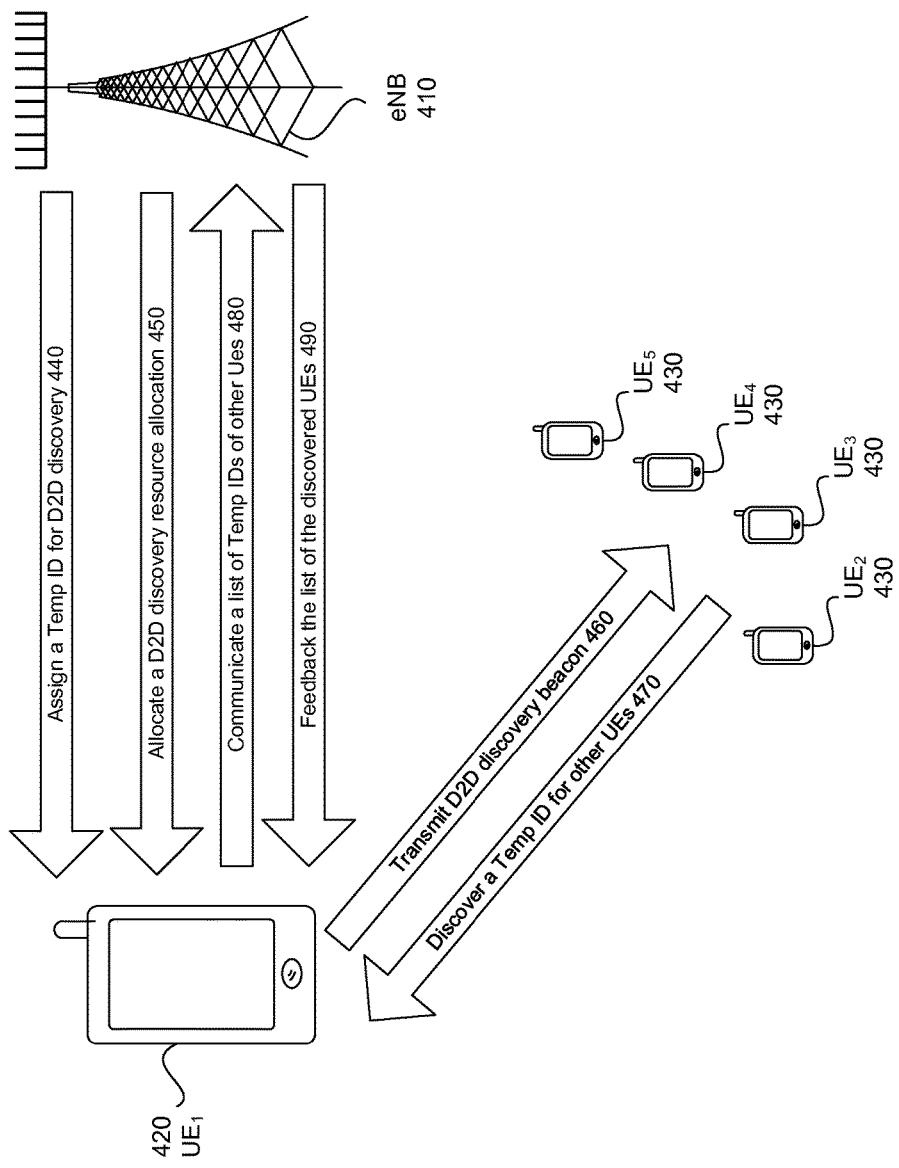
FIG. 4 shows a UE that is in communication with both an eNB as well as other UEs in accordance with an example.

FIG. 4 shows a $UE_1$ (420) that is in communication with both an eNB 410 as well as $UE_2$-$UE_5$ (430). In FIG. 4 the eNB 410 assigns a Temp ID for D2D discovery 440 to $UE_1$ (420). The eNB 410 also allocates a D2D discovery resource allocation 450 for $UE_1$ (420), providing time and frequency blocks in which the $UE_1$ can communicate an ID for discovery. In one embodiment, the time and frequency blocks may correspond with uplink subframes that are available for communication with the eNB. The $UE_1$ (420) then transmits a D2D discovery beacon 460 to other UEs in the D2D network, such as $UE_2$-$UE_5$ (430). $UE_1$ further discovers the Temp ID of other UEs 470, such as $UE_2$-$UE_5$ (430), in the D2D network. $UE_1$ (420) communicates a list of the Temp IDs 480 to the eNB 410. The eNB 410 then feeds back a list of the discovered UEs 490 to the $UE_1$ (420). The information included in the list of the discovered UEs enables the UE to request D2D communication with the other UEs.

In one example, the UEs in a wireless network that are configured for D2D communication can synchronize within the wireless network using a radio frame structure, transmitted on a physical (PHY) layer in a uplink transmission between an eNB and a UE. In one embodiment a 3GPP LTE frame structure can be used for the synchronization, as illustrated in FIG. 5.

Figure 5:
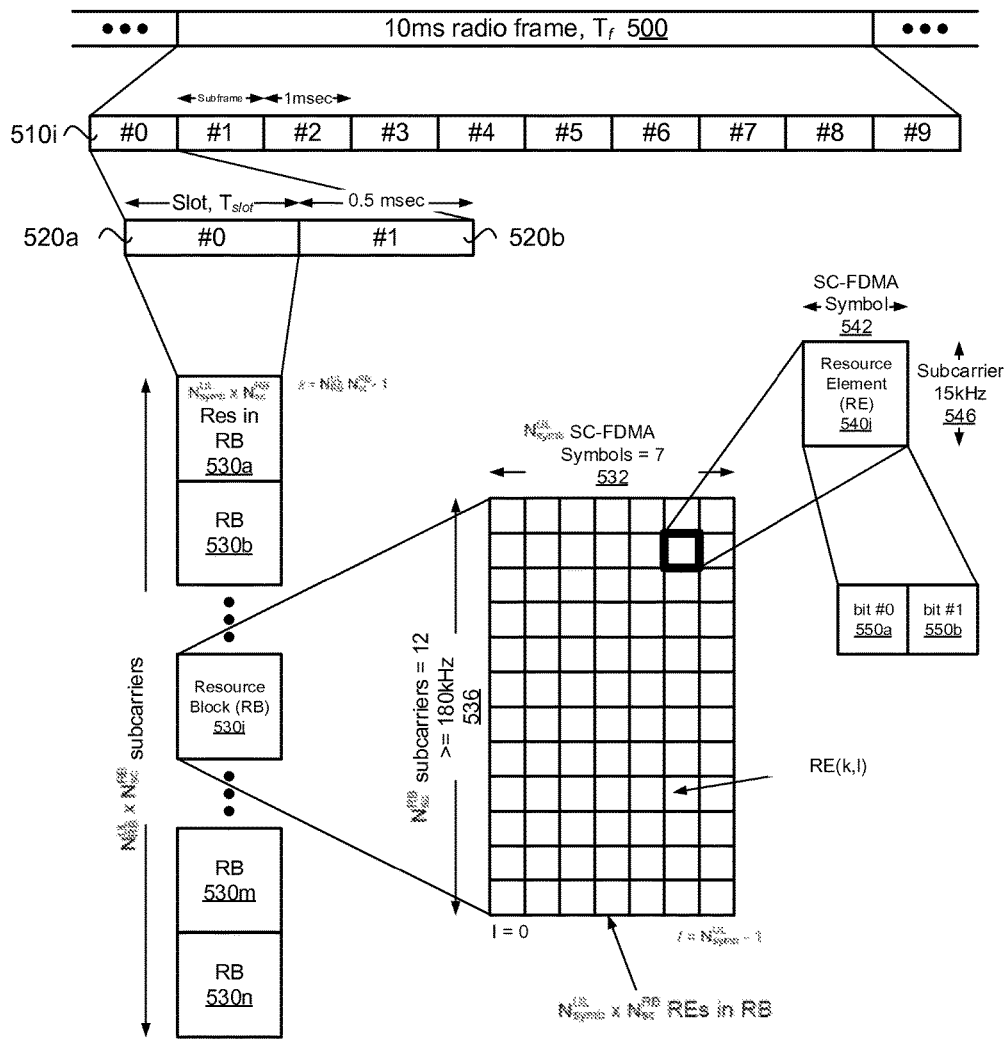
FIG. 5 illustrates an uplink radio frame structure in accordance with an example.

FIG. 5 illustrates an uplink radio frame structure. In the example, a radio frame 500 of a signal used to transmit control information or data can be configured to have a duration, $T_f$, of 10 milliseconds (ms). Each radio frame can be segmented or divided into ten subframes 510i that are each 1 ms long. Each subframe can be further subdivided into two slots 520a and 520b, each with a duration, $T_{slot}$, of 0.5 ms. Each slot for a component carrier (CC) used by the wireless device and the node can include multiple resource blocks (RBs) 530a, 530b, 530i, 530m, and 530n based on the CC frequency bandwidth. Each RB (physical RB or PRB) 530i can include 12-15 kHz subcarriers 536 (on the frequency axis) and 6 or 7 SC-FDMA symbols 532 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 540i using short or normal cyclic prefixing, or the resource block can be mapped to 72 REs (not shown) using extended cyclic prefixing. The RE can be a unit of one SC-FDMA symbol 542 by one subcarrier (i.e., 15 kHz) 546. Each RE can transmit two bits 550a and 550b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

An uplink signal or channel can include data on a Physical Uplink Shared Channel (PUSCH) or control information on a Physical Uplink Control Channel (PUCCH). In LTE, the physical uplink control channel (PUCCH) carrying uplink control information (UCI) can include channel state information (CSI) reports, Hybrid Automatic Retransmission request (HARQ) ACKnowledgment/Negative ACKnowledgment (ACK/NACK) and uplink scheduling requests (SR).

Figure 6:
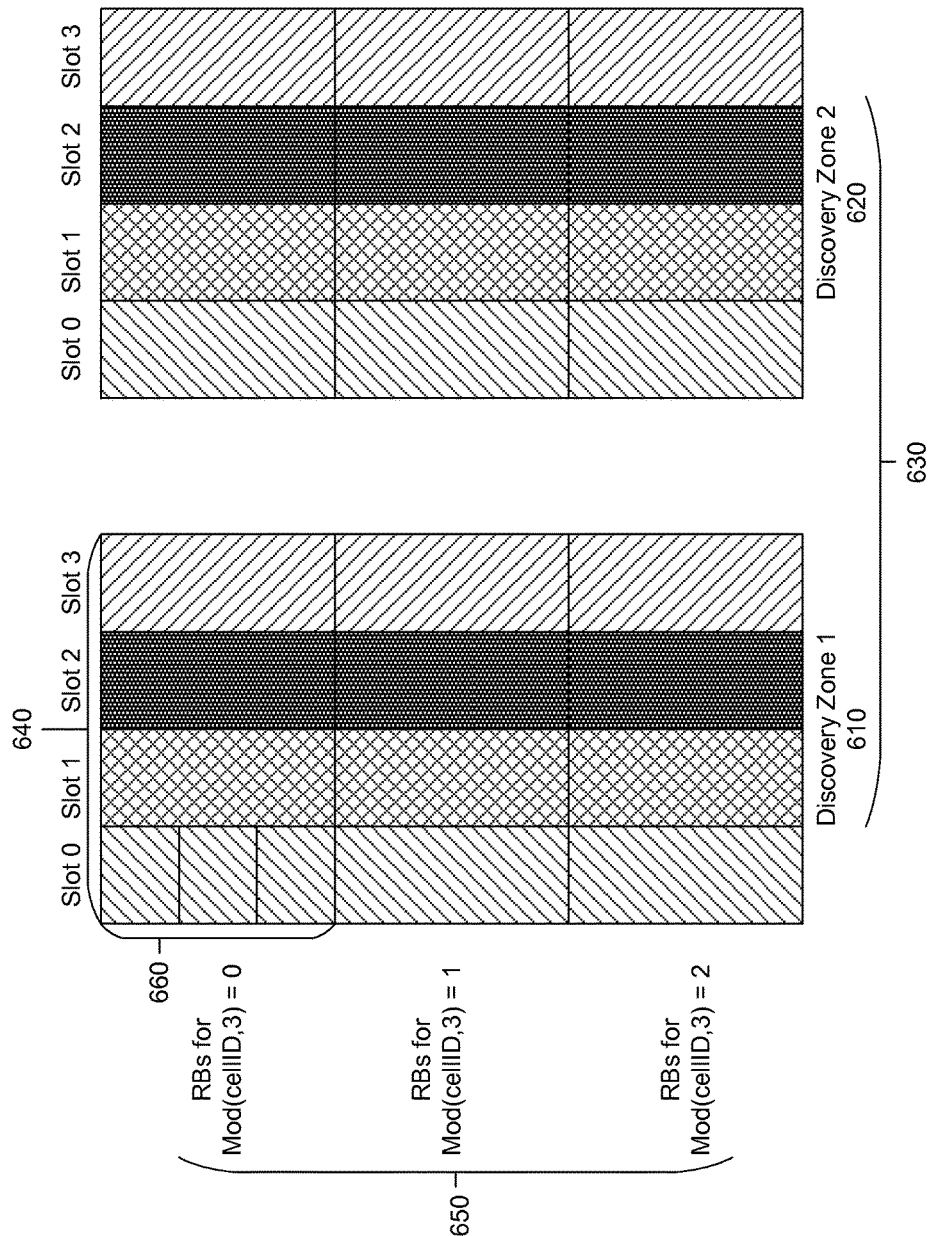
FIG. 6 depicts a discovery zone resource allocation in accordance with an example.

FIG. 6 depicts an example of discovery zone resource allocation, such as discovery zone 1 (610) and discovery zone 2 (620). As shown in FIG. 6, the D2D resources together with a D2D sequence can be used to determine a unique device Temp ID. With the Temp ID and eNB's cell identification (cell ID) as input parameters, each UE can identify the corresponding resources in which it will transmit the D2D discovery sequence. In one embodiment, the output parameters for each UE can include: $n_f$, $n_t$, and $n_{seq}$. The value $n_f$ is the RB index per slot per cell, $n_t$ is the slot index in each discovery zone, and $n_{seq}$ is the discovery sequence index. In FIG. 6, the cell ID (650) is between 0-2, $n_f$ (660) is between 0-2 for cell ID=0, $n_t$ (640) is 0 to 3 for each discovery zone, and $n_{seq}$ (630) comprises discovery zone 1 and discovery zone 2.

In one embodiment, the UE can use a mapping rule to determine the corresponding resources to transmit the discovery sequence. In one embodiment, the mapping rule can use the following criteria in determining the corresponding resource: to address a half-duplex constraint, $n_t$ can be different in the next discovery zone for two UEs with same $n_t$ in the current discovery zone; to achieve frequency diversity, $n_f$ can be different in the next discovery zone for one UE; and to reduce inter-cell interference, the discovery zone can be reuse 3. In one embodiment, based on the cell size and the target D2D discovery range, a the reuse value can increase or decrease.

In one embodiment, the UEs can be configured with additional parameters such as the total number of sequences ($N_{seq}$), the total number of RBs (in the frequency dimension) per cell in a discovery slot ($N_f$), and/or the total number of discovery slots in a discovery zone ($N_t$). The additional parameters can be configured using higher layer signaling, such as via semi-static RRC signaling in a cell-specific manner, depending on the population of UEs participating in proximity services, the deployment scenario, and other system parameters. In another embodiment when the UE is equipped with multiple transmit antennas, the UE might be assigned additional Temp IDs so that the $n_t$ and $n_f$ are the same or substantially similar but $n_{seq}$ may vary or is different for the UEs different transmit antennas.

In one embodiment, the D2D discovery sequence design can be based on the network synchronization of the UE with the eNB being achieved through an UL channel, such as a control channel, a shared channel, or another desired channel. The subframe and slot boundary of the uplink radio frame structure are synchronized for D2D discovery. In one embodiment, the D2D discovery sequence design is based, in part, on non-coherent energy detection. The D2D discovery sequence design may be also be based on the following: a correlation property; resource availability or allocation; and/or a peak to average power ratio (PAPR).

In one embodiment when the D2D discovery sequence design is based on a correlation property, the cross correlation can be taken into account in order to achieve multiplexing capacity. In another embodiment, auto correlation may not be evaluated since a time synchronization is achieved for D2D discovery.

In one embodiment, when the D2D discovery sequence design is based on resource availability or allocation, one RB or one RB pair may be used as the basic element for the D2D discovery sequence design. In another embodiment, the channel selectivity can be minimized over the discovery sequence.

In one embodiment, when the D2D discovery sequence design is based on the PAPR, the PAPR is used to select the candidate D2D discovery sequence.

In one embodiment, a Hadamard matrix can be used for the D2D discovery sequence design. The D2D discovery sequence design using a Hadamard matrix may be based on the correlation property, resource availability or allocation, and/or a PAPR.

In one embodiment of the Hadamard matrix based D2D discovery sequence design, the Hadamard matrix is based on the discovery resource size. For example, the resource size may be one RB, which size is 12 subcarrier×7 SC-FDMA symbols, or one RB pair, which size is 12 subcarriers×14 SC-FDMA symbols. In one embodiment, the length of the Hadamard matrix is a multiple of 4. When the length of the Hadamard matrix is a multiple of 4 there is at least one candidate for D2D discovery sequence design. For each candidate for D2D discovery sequence design, the D2D discovery sequence is mapped in frequency first order and the PAPR is calculated for each SC-FDMA symbol. In one embodiment, D2D discovery sequences with very high PAPR can be eliminated. The beacon sequences can be mapped in the frequency domain directly without the use of a discrete Fourier transform (DFT) operation (similar to UL DMRS). Where an element of a Hadamard matrix is −1 and 1, there is a low calculation complexity for exhaustive searches.

In another embodiment, a PUCCH format 1 is used for the D2D discovery sequence design. The D2D discovery sequence design using a PUCCH format 1 may be based on the correlation property, resource availability or allocation, and/or a PAPR. In one embodiment, the PUCCH format 1 follows a UL PUCCH design. For each SC-FDMA symbol, a length-12 QPSK modulated sequence with minimum PAPR is used. In one embodiment, the length-12 QPSK modulated sequence are tabulated according to ETSI TS 136.211 V11.0.0 (2012-10) (3GPP TS 36.211, V 11.0.0, section 5.5.1). In one embodiment, the D2D discovery sequence is expanded to 7 SC-FDMA symbols using a selected or defined orthogonal cover code. In one example, length 7 DFT codes are used and the length 7 DFT codes in the sequences are complex values, and may be more sensitive to timing offset.

In one example of a D2D discovery procedure with D2D discovery sequence design, one RB (12×7) is used as the basic D2D discovery resource element, with one RB per cell per discovery slot. In one embodiment of the D2D discovery sequence design, a discovery slot comprises of multiple RBs in the frequency dimension per cell. In this example, for a length 84 (12×7) First Paley type Hadamard matrix, D2D discovery sequences having a PAPR greater than 7 dB are removed. In one embodiment, after removing the D2D discovery sequences having a PAPR greater than 7 dB, there are 78 D2D discovery sequences per slot, i.e. $N_{seq}$=78. In another embodiment where all the D2D discovery sequences have a PAPR less than 7 dB, i.e. there are 84 D2D discovery sequences, a subset of the available length-12 QPSK sequences may be used with a minimum distance between any two sequences in the cyclic shift domain of greater than unity. The subset of the available length-12 QPSK sequences may be used to allow for better orthogonality in scenarios with channels with higher delay spreads.

In this example, the eNB will allocate 78 slots, i.e. $N_t$=78 slots, and 1 RB per slot, i.e. $N_f$=1 for one D2D discovery zone. The number of slots in each discovery zone and the discovery zone periodicity may be configured based on a discovery delay, a resource overhead, and/or UE battery power consumption. Each UE can be assigned a Temp ID from 0-6082 (78×78−1) by the eNB. The UE can select a source and a sequence based on Temp ID and a certain mapping rule. In one embodiment, the mapping rule is Temp ID=the number of resource elements in a resource block×RB index+sequence ID, where the RB index (e.g. $n_t$) is numbered 0 to 77, and the sequence identification (sequence ID) (e.g. $n_{seq}$) is numbered 0 to 77. The mapping rule for resource allocation enables there to be no collisions within a cell and in adjacent cells between UEs to transmit discovery beacon, where the neighboring cells assign unique D2D Temp IDs to their UEs.

In one embodiment, a half-duplex problem is prevented, at the next discovery zone, by shuffling D2D resources so that the UEs that transmitted at the same slot in the previous discovery zone can transmit at different slots in the current discovery zone. For example, newSequenceID=sequenceID and newRBindex=(RBindex+sequenceID) mod 78. In this example, the UEs that transmitted at the same slot during the first discovery zone will transmit at different discovery slots at the next zone. In one embodiment, UEs that are not transmitting discovery beacons will attempt to decode the D2D discovery sequence for each slot, in order to discovery as many UEs as possible within a proximity range.

Figure 7:
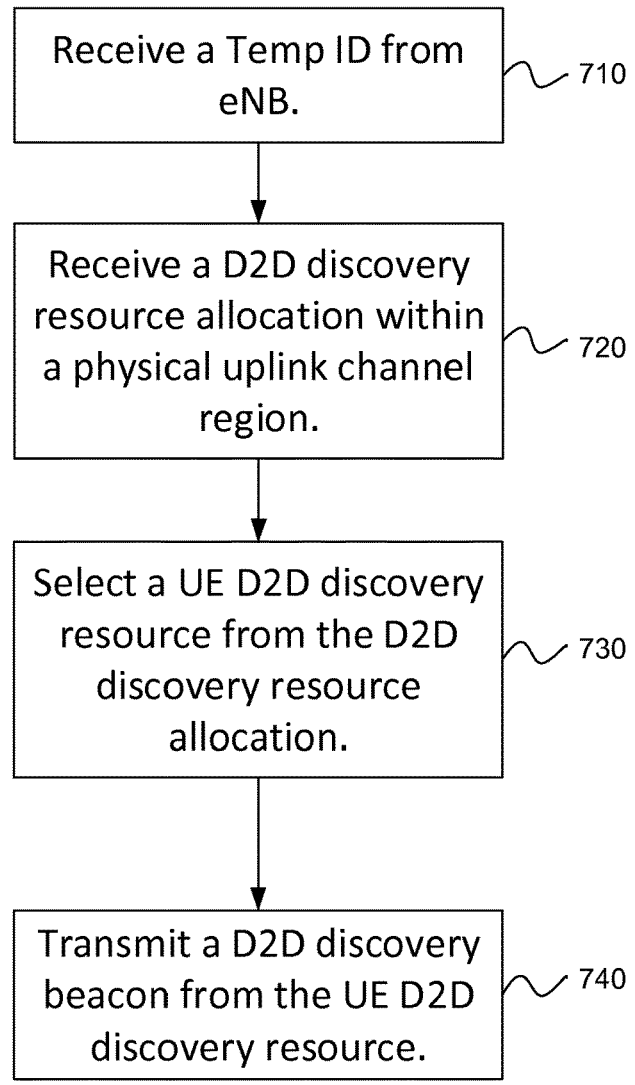
FIG. 7 depicts the functionality of the computer circuitry of a UE operable perform D2D discovery with an eNB in a D2D network in accordance with an example.

FIG. 7 provides a flow chart to illustrate the functionality of one embodiment of the computer circuitry of a UE operable to perform D2D discovery in a D2D network. The functionality may be implemented as a method or the functionality may be executed as instructions on a machine, where the instructions are included on at least one computer readable medium or one non-transitory machine readable storage medium. The computer circuitry can be configured to receive a Temp ID from an eNB, as in block 710. The computer circuitry can be further configured to receive a D2D discovery resource allocation within a physical uplink channel from the eNB, as in block 720. The computer circuitry can also be configured to select a UE D2D discovery resource from the D2D discovery resource allocation based on the Temp ID, as in block 730. The computer circuitry can be further configured to transmit a D2D discovery beacon from the UE D2D discovery resource to enable other UEs to detect the UE, as in block 740.

In one embodiment, the physical uplink channel can be a physical uplink control channel (PUCCH) or a physical uplink shared channel (PUSCH). In one embodiment, the computer circuitry is configured to receive a list of discovered UEs from the eNB using a PDSCH. In another embodiment, computer circuitry is configured to receive a unique Temp ID from the eNB for each antenna at the UE. In one embodiment, the computer circuitry is configured to receive a D2D discovery beacon from the other UEs and determine the Temp ID of the other UEs based on the D2D discovery beacon. In one embodiment, the computer circuitry is configured to select the UE D2D discovery resource from the D2D discovery resource allocation based on a Temp ID and a cell ID of the eNB. In another embodiment, the UE identifies an RB index, a slot index, and a discovery sequence index, based on the temp ID and the cell ID.

Figure 8:
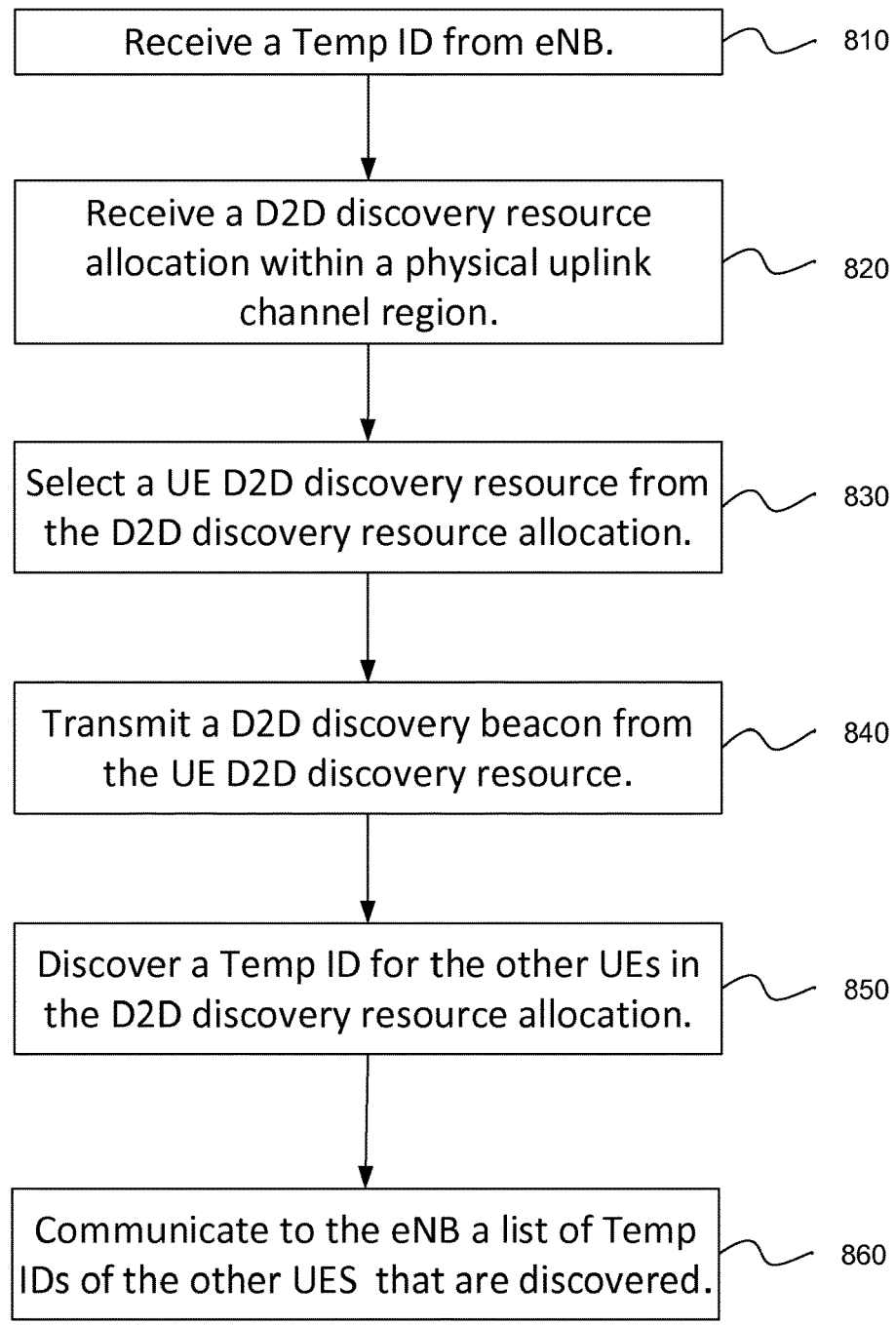
FIG. 8 depicts the functionality of the computer circuitry of a UE operable to discover and communicate a list of temporary identifications (Temp IDs) in a D2D network in accordance with an example.

FIG. 8 provides a flow chart to illustrate the functionality of one embodiment of the computer circuitry of a UE operable to communicate in a D2D network. The functionality may be implemented as a method or the functionality may be executed as instructions on a machine, where the instructions are included on at least one computer readable medium or one non-transitory machine readable storage medium. The computer circuitry can be configured to receive a Temp ID from an eNB, as in block 810. The computer circuitry can be further configured to receive a D2D discovery resource allocation within a physical uplink channel from the eNB, as in block 820. In one embodiment, the physical uplink channel can be a physical uplink control channel (PUCCH) or a physical uplink shared channel (PUSCH). The computer circuitry can also be configured to select a UE D2D discovery resource from the D2D discovery resource allocation based on the Temp ID, as in block 830. The computer circuitry can be further configured to transmit a D2D discovery beacon from the UE D2D discovery resource to enable other UEs to detect the UE, as in block 840. The computer circuitry can further be configured to discover a Temp ID for the other UEs in the D2D discovery allocation, as in block 850. The computer circuitry can further be configured to communicate to the eNB, using a PUSCH, as list of Temp IDs of the other UEs that are discovered, as in block 860.

Figure 9:
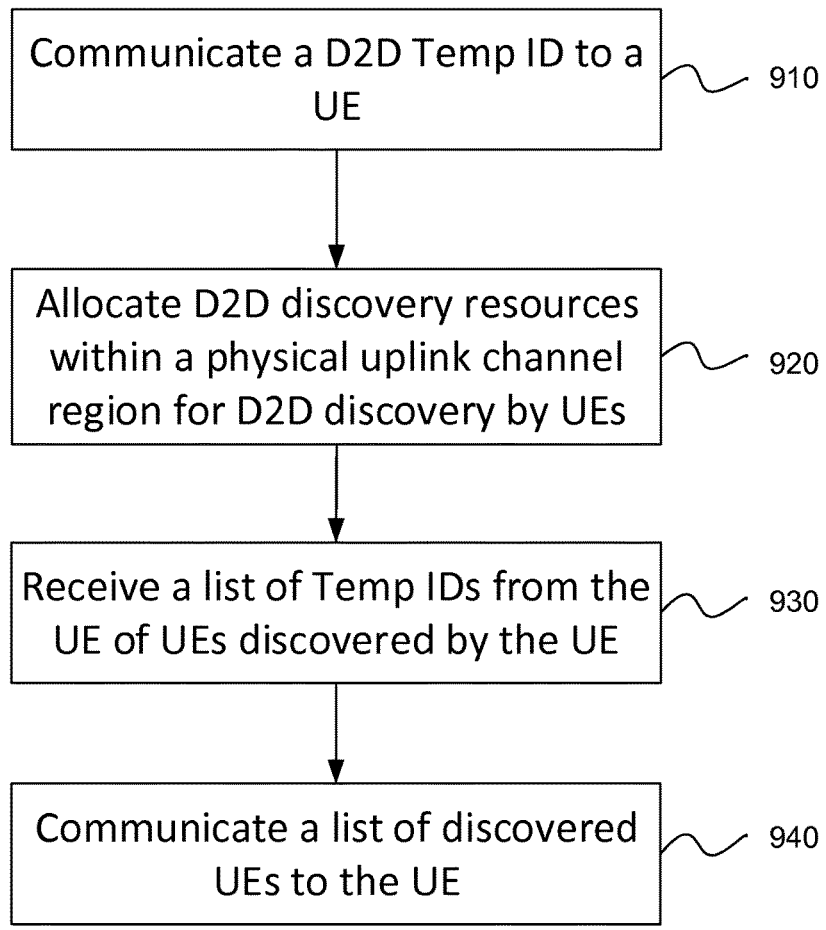
FIG. 9 depicts the functionality of the computer circuitry of an eNB operable to communicate with a UE in a D2D network in accordance with an example.

FIG. 9 provides a flow chart to illustrate the functionality of one embodiment of the computer circuitry of an eNB operable to communicate in a D2D network. The functionality may be implemented as a method or the functionality may be executed as instructions on a machine, where the instructions are included on at least one computer readable medium or one non-transitory machine readable storage medium. The computer circuitry can be configured to communicate a D2D Temp ID to a UE, as in block 910. The computer circuitry can be further configured to allocate a D2D discovery resource within a physical uplink channel for discovery by UEs served by the eNB, as in block 920. The computer circuitry can also be configured to receive, from the UE, a list of Temp IDs of UEs discovered by the UE, as in block 930. The computer circuitry can be further configured to communicate a list of discovered UEs, based on the list of Temp IDs, to the UE, as in block 940.

In one embodiment, the physical uplink channel can be a physical uplink control channel (PUCCH) or a physical uplink shared channel (PUSCH). In one embodiment, the received list of Temp IDs of UEs is received using a PUSCH. In another embodiment, a list of discovered UEs is communicated to the UE using a PDSCH. In another embodiment, the Temp ID is unique over a plurality of cells that are adjacent to the eNB. In one embodiment, the quantity of the D2D discovery resource change based on a number of UEs within a cell served by the node.

Figure 10:
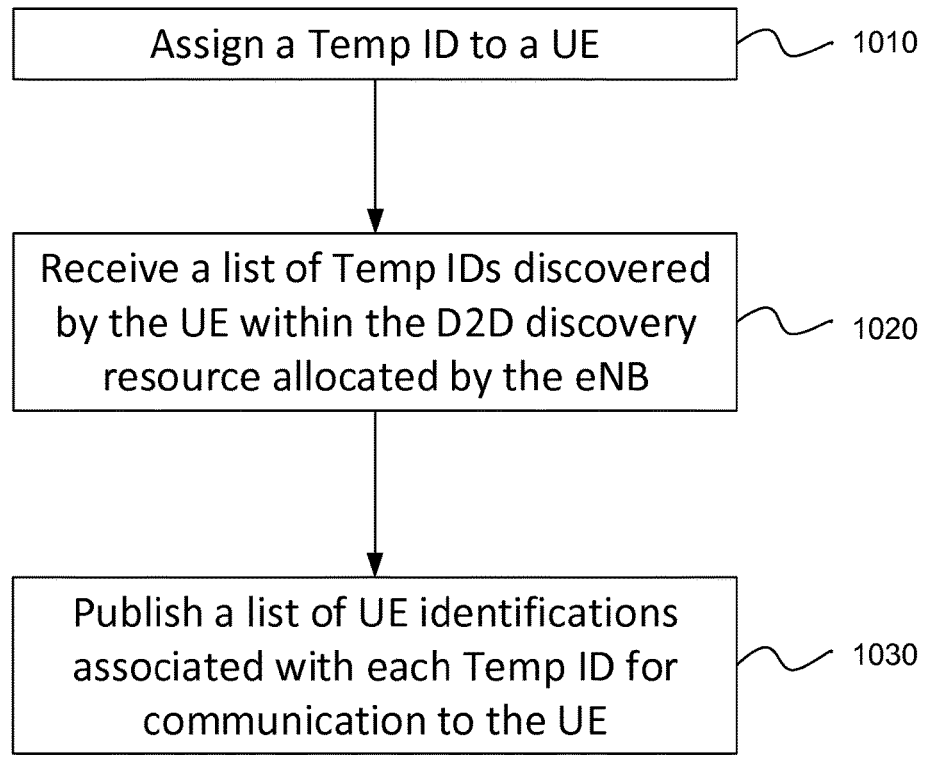
FIG. 10 depicts the functionality of the computer circuitry of a server operable to communicate with a UE that is operable to communicate in a D2D network in accordance with an example.

FIG. 10 uses a flow chart to illustrate the functionality of one embodiment of the of the computer circuitry of a server operable to communicate with a UE that is configured to communicate in a D2D network. The functionality may be implemented as a method or the functionality may be executed as instructions on a machine, where the instructions are included on at least one computer readable medium or one non-transitory machine readable storage medium. The computer circuitry can be configured to assign a Temp ID to a UE, wherein the Temp ID is configured to enable the UE to select a UE D2D discovery resource for use in D2D discovery from a D2D discovery resource allocated by an eNB, as in block 1010. The computer circuitry can be further configured to receive a list of Temp IDs discovered by the UE within the D2D discovery resource allocated by the eNB, as in block 1020. The computer circuitry can also be configured to publish, for the list of Temp IDs discovered, a list of UE identifications associated with each Temp ID for communication to the UE to enable the UE to discover other UEs and form a D2D link, as in block 1030.

In one embodiment, a number of the Temp IDs available to be assigned by the server is sufficient to allow each UE served by the eNB to have a unique D2D discovery resource. In another embodiment, the Temp ID and a mapping rule enables the UE to select a UE D2D discovery resource source location within the D2D discovery resource allocated by the eNB. In another embodiment, a mapping rule comprises the number of resource elements in a RB multiplied by a RB block index added to a sequence ID. In one embodiment, the RB index is determined at the UE based on the Temp ID. In another embodiment, the RB index is determined at the UE based on the Temp ID. In one embodiment, the sequence ID is determined at the UE based on the Temp ID. In another embodiment, a new RB index is computed by modulating the sum of the RB index and the sequence ID by 78. In one embodiment, the computer circuitry is further configured to prevent half-duplexing by assigning a new Temp ID to a UE that has transmitted a D2D discovery beacon.

Figure 11:
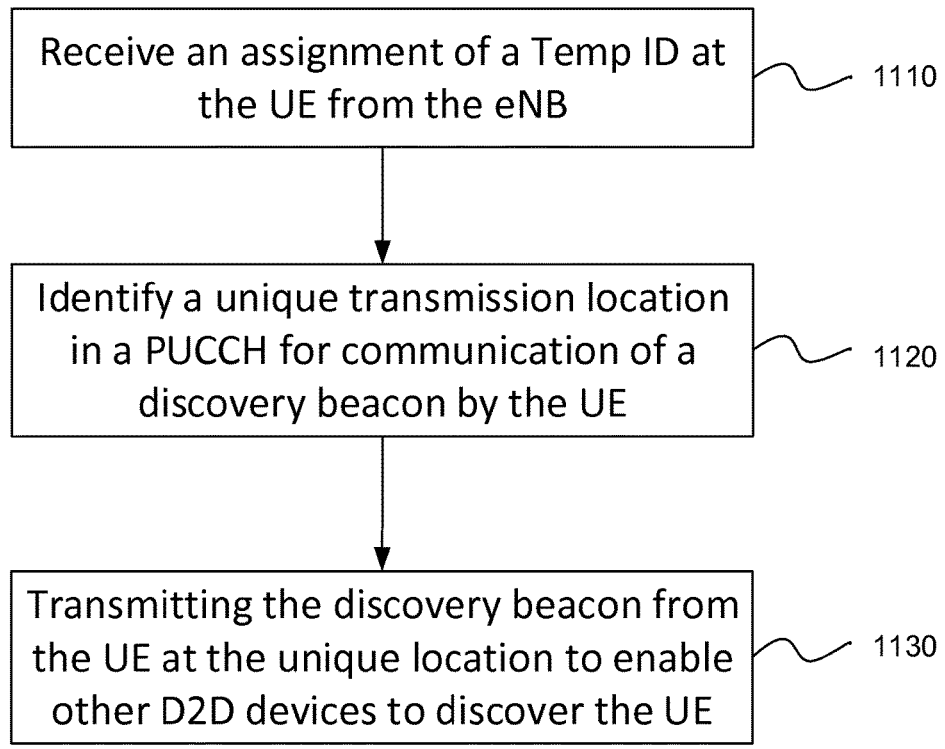
FIG. 11 illustrates a method for allocating a D2D discovery resource by an eNB to a UE in accordance with an example.

Another example provides a method for allocating a D2D discovery resource by an eNB to a UE, as shown in the flow chart in FIG. 11. The method may be executed as instructions on a machine, computer circuitry, or a processor for the node (e.g., eNB), where the instructions are included on at least one computer readable medium or one non-transitory machine readable storage medium. The method includes receiving an assignment of a temporary identification (Temp ID) at the UE from the eNB, wherein the Temp ID is unique for each UE operating in a cell served by the eNB, as in block 1110. The method includes identifying a unique transmission location in a PUCCH, based on the Temp ID, for communication of a D2D discovery beacon by the UE, as in block 1120. The method includes transmitting the D2D discovery beacon from the UE at the unique transmission location to enable other D2D devices to discover the UE, as in block 1130.

In one embodiment, the number of the Temp IDs available to be assigned by the server is sufficient to allow each UE served by the eNB to have a unique D2D discovery resource. In another embodiment, the Temp ID and a mapping rule enables the UE to select a UE D2D discovery resource source location within the D2D discovery resource allocated by the eNB. In another embodiment, the RB index is determined at the UE based on the Temp ID. In one embodiment, the sequence ID is determined at the UE based on the Temp ID. In another embodiment, a new RB index is computed by modulating the sum of the RB index and the sequence ID by 78. In another embodiment, the computer circuitry is configured to prevent half-duplexing by assigning a new Temp ID to a UE that has transmitted a D2D discovery beacon.

Figure 12:
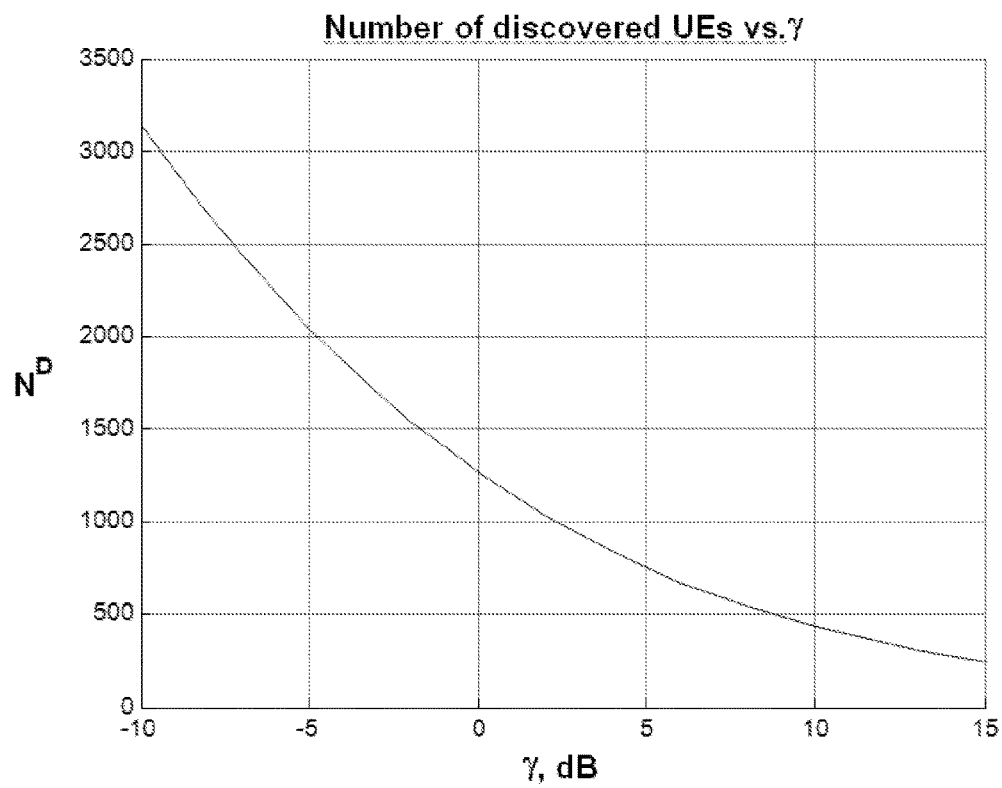
FIG. 12 depicts a graph illustrating a number of UEs versus a threshold used for energy detection in accordance with an example.

FIG. 12 uses a graph to show the number of UEs versus the threshold used for energy detection. In FIG. 12, $N^D$ is the number of UE discovered (one shot discovery) and $\gamma$ is the threshold used for energy detection. In a 1 Tx transmit antenna and 2 Rx receive antenna case with energy detection, 0 dB threshold can be used which corresponding to 99% of detection probability and 0.1% false alarm probability.

Figure 13:
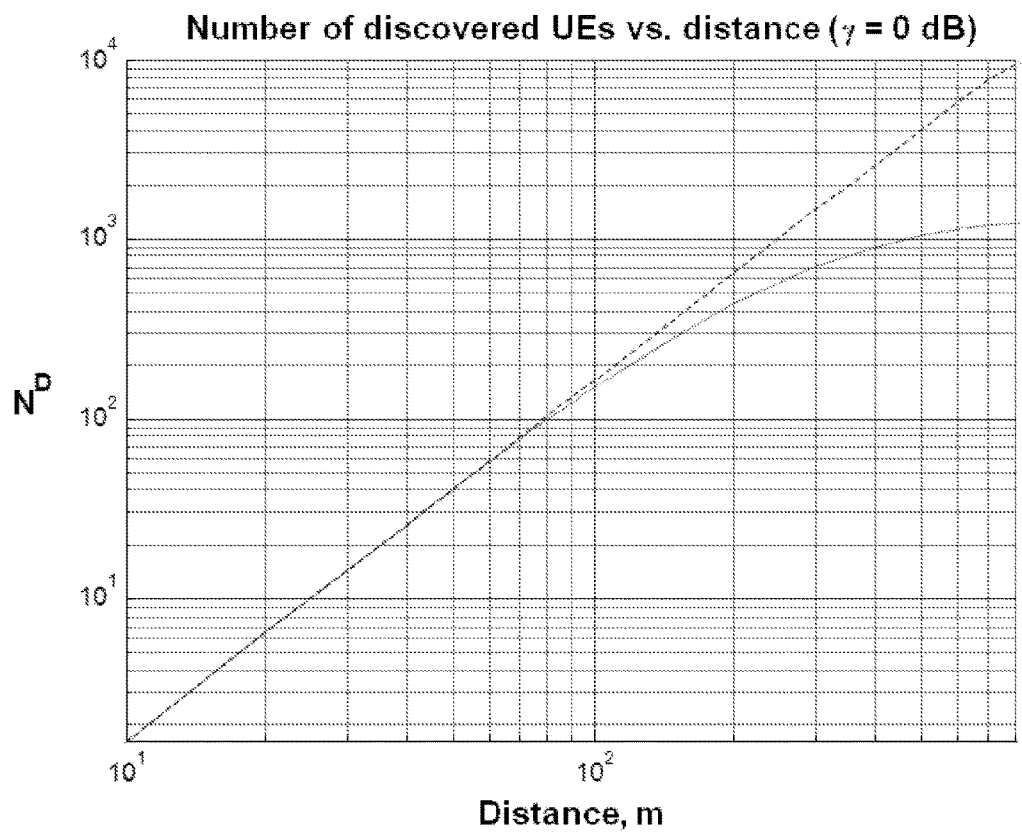
FIG. 13 depicts a graph showing a number of UEs versus a distance m in accordance with an example.

FIG. 13 uses a graph to show the number of UEs versus a distance m. In FIG. 13, $\gamma$ is equal to 0 dB, where a 0 dB threshold can be used which corresponding to 99% of detection probability and 0.1% false alarm probability.

Figure 14:
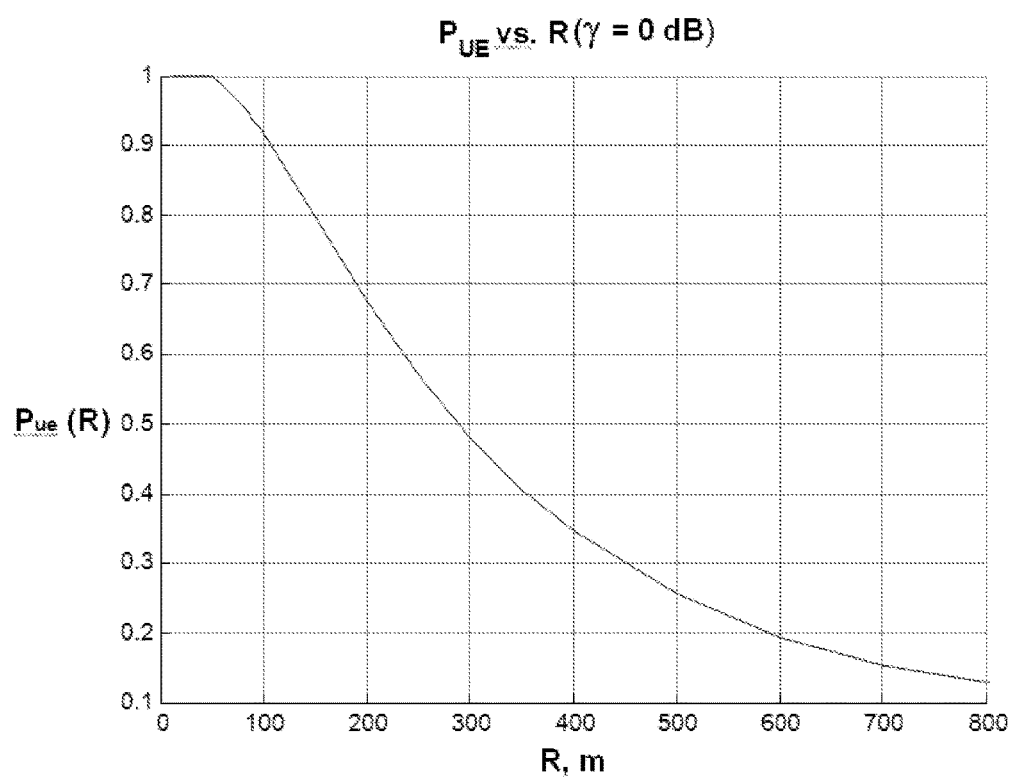
FIG. 14 depicts a graph showing an average percentage of UEs discovered at a distance less than R in accordance with an example.

FIG. 14 uses a graph to show the average percentage of UEs discovered at the distance less than R.

Figure 15:
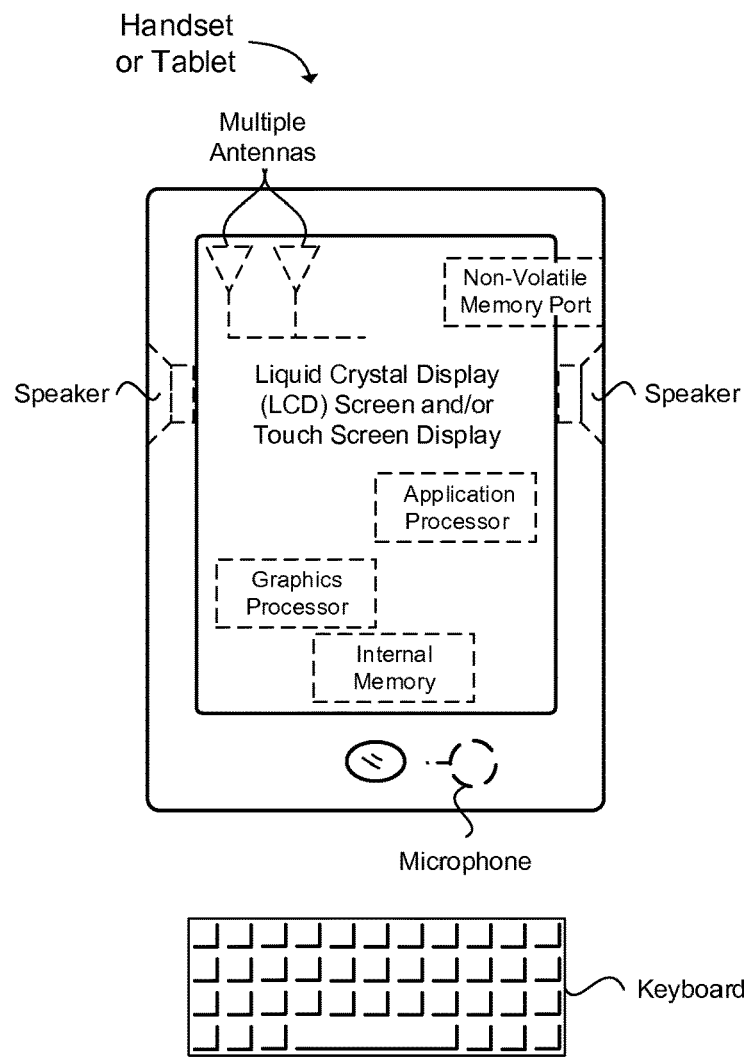
FIG. 15 illustrates a diagram of a user equipment (UE) in accordance with an example.

FIG. 15 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 15 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to communicate in a device to device (D2D) network, the UE comprising:
   one or more processors configured to:
      receive a temporary identification (Temp ID) from an enhanced node B (eNB);
      receive a D2D discovery resource allocation within a physical uplink channel from the eNB;
      select a UE D2D discovery resource from the D2D discovery resource allocation based on the Temp ID and a cell identification (cell ID) of the eNB wherein the UE identifies a resource block index, a slot index, and a discovery sequence index, based on the temp ID and the cell ID; and
      transmit a D2D discovery beacon from the UE D2D discovery resource to enable other UEs to detect the UE; and
   a memory coupled to the one or more processors and configured to store the Temp ID.

2. The UE of claim 1, wherein the physical uplink channel is a physical uplink control channel (PUCCH) or a physical uplink shared channel (PUSCH).

3. The UE of claim 1, wherein the one or more processors are further configured to:
   discover a Temp ID for the other UEs in the D2D discovery resource allocation; and
   communicate to the eNB, using a physical uplink shared channel (PUSCH), a list of Temp IDs of the other UEs that are discovered.

4. The UE of claim 1, wherein the one or more processors are further configured to receive a list of discovered UEs from the eNB using a physical uplink shared channel (PUSCH).

5. The UE of claim 1, wherein the one or more processors are further configured to:
   receive a D2D discovery beacon from the other UEs; and
   determine the Temp ID of the other UEs based on the D2D discovery beacon.

6. An enhanced node B (eNB) operable to communicate in a device to device (D2D) network, the eNB comprising:
   one or more processors configured to:
      communicate a D2D temporary identification (Temp ID) to a user equipment (UE);
      communicate a unique Temp ID from the eNB for each antenna at the UE;
      allocate a D2D discovery resource within a physical uplink channel for D2D discovery by UEs served by the eNB;
      receive, from the UE, a list of Temp IDs of UEs discovered by the UE; and
      communicate a list of discovered UEs, based on the list of Temp IDs, to the UE; and
   a memory coupled to the one or more processors and configured to store the list of discovered UEs.

7. The NB of claim 6, wherein the physical uplink channel is a physical uplink control channel (PUCCH) or a physical uplink shared channel (PUSCH).

8. The NB of claim 6, wherein the received list of Temp IDs of UEs is received using a physical uplink shared channel (PUSCH).

9. The NB of claim 6, wherein the communicated list of discovered UEs is communicated to the UE using a physical uplink shared channel (PUSCH).

10. The NB of claim 6, wherein the communicated Temp ID is unique over a plurality of cells that are adjacent to the eNB.

11. The NB of claim 6, wherein a quantity of the D2D discovery resource changes based on a number of UEs within a cell served by the node.

12. A server operable to communicate with a user equipment (UE) that is operable to communicate in a device to device (D2D) network, the server comprising:
   one or more processors configured to:
      assign a temporary ID (Temp ID) to a user equipment (UE), wherein the Temp ID is configured to enable the UE to select a UE D2D discovery resource for use in D2D discovery from a D2D discovery resource allocated by an eNB wherein the Temp ID and a mapping rule enables the UE to select a UE D2D discovery resource source location within the D2D discovery resource allocated by the eNB, wherein the mapping rule comprises the number of resource elements in a resource block multiplied by a resource block index (RB index) added to a sequence identification (sequence ID);
      receive a list of Temp IDs discovered by the UE within the D2D discovery resource allocated by the eNB; and
      publish, for the list of Temp IDs discovered, a list of UE identifications associated with each Temp ID for communication to the UE to enable the UE to discover other UEs and form a D2D link; and a memory coupled to the one or more processors and configured to store the D2D discovery resource.

13. The server of claim 12, wherein a number of the Temp IDs available to be assigned by the server is sufficient to allow each UE served by the eNB to have a unique D2D discovery resource.

14. The server of claim 12, wherein the RB index is determined at the UE based on the Temp ID.

15. The server of claim 14, wherein a new RB index is computed by modulating the sum of the RB index and the sequence ID by 78.

16. The server of claim 12, wherein the sequence ID is determined at the UE based on the Temp ID.

17. The server of claim 12, further configured to prevent half-duplexing by assigning a new Temp ID to a UE that has transmitted a D2D discovery beacon.

18. A method for allocating a device to device (D2D) discovery resource by an enhanced node B (eNB) to a user equipment (UE), comprising:

receiving an assignment of a temporary identification (temp ID) at the UE from the eNB, wherein the temp ID is unique for each UE operating in a cell served by the eNB and the Temp ID is unique for each antenna at the UE;

identifying a unique transmission location in a physical uplink control channel (PUCCH), based on the Temp ID, for communication of a D2D discovery beacon by the UE; and transmitting the D2D discovery beacon from the UE at the unique transmission location to enable other D2D devices to discover the UE.

19. The method of claim 18, wherein identifying the unique transmission location further comprises receiving an allocation of a selected number of slots in the PUCCH for a discovery zone, wherein each slot comprises a selected number of resource blocks.

20. The method of claim 19, wherein each of the resource blocks further comprise a selected number of subcarriers and a selected number of orthogonal frequency-division multiplexing (OFDM) symbols.

21. The method of claim 20, wherein a subcarriers length for each of the resource blocks is a length-12 quadrature phase shift keying (QPSK) modulated sequence with a selected peak-to-average power ratio (PAPR).

22. The method of claim 21, wherein the OFDM symbols length for each of the resource blocks is 7 OFDM symbols using an orthogonal cover code.

23. The method of claim 18, further comprising identifying a unique transmission location using a Hadamard matrix.

24. The method of claim 18, wherein the discovery beacon is transmitted based on a D2D discovery sequence design.

25. The method of claim 24, wherein the D2D discovery sequence design is based on:
a correlation property;
a resource available; and
a peak-to-average power ratio (PAPR).

* * * * *